June 27, 1933.  A. H. FAGER  1,915,883
DUMP TRUCK AND TRAILER CONSTRUCTION
Filed Feb. 18, 1930   5 Sheets-Sheet 1

Inventor
Albert H. Fager
Attorney.

June 27, 1933.   A. H. FAGER   1,915,883
DUMP TRUCK AND TRAILER CONSTRUCTION
Filed Feb. 18, 1930   5 Sheets-Sheet 3

Inventor
Albert H. Fager.

Attorney.

June 27, 1933.　　　A. H. FAGER　　　1,915,883
DUMP TRUCK AND TRAILER CONSTRUCTION
Filed Feb. 18, 1930　　　5 Sheets-Sheet 5

Inventor
Albert H. Fager.
Attorney.

Patented June 27, 1933

1,915,883

UNITED STATES PATENT OFFICE

ALBERT H. FAGER, OF LOS ANGELES, CALIFORNIA, ASSIGNOR TO FAGER HYDRAULIC HOIST & BODY COMPANY, OF LOS ANGELES, CALIFORNIA, A CORPORATION OF CALIFORNIA

DUMP TRUCK AND TRAILER CONSTRUCTION

Application filed February 18, 1930. Serial No. 429,263.

My invention relates generally to automotive vehicle constructions, and more particularly to an operative combination including an automotive dump truck and a trailer dump truck, the two being designed for the handling of sand, gravel, loose earth, etc.

In commercial hauling or trucking, the primary consideration is economy; that is, the desideratum is the delivery of the greatest pay load at the least expense. In working to this end, it has become the practice to couple dump trailers to dump trucks, in tandem; the trailer carrying the equivalent of the dump truck load, and being the equivalent of the dump truck, insofar as transportation is concerned, except that the trailer is less costly to produce and maintain, and does not require a driver.

The use of trailers, in connection with dump trucks, has also been brought about by the existence of various State laws which limit the weight which may be carried upon any axle or any one wheel, having a given road contacting surface. Such legislation is for the protection of the highways, and prevents their being broken up by the carrying of excessive loads on a single vehicle.

While the use of dump truck trailers has been satisfactory and has largely effected the economy sought, insofar as the transportation of loads from place to place is concerned, certain difficulties have been heretofore encountered, which are overcome by the use of my invention. The principle difficulty has been that of backing up the coupled trailer and truck. The form of steering connection between the two is of necessity such that accurate steering of the trailer during backward movement cannot be effected. As it is often necessary to enter places of limited area, such as excavations for buildings, and the like, either to take on or to deliver loads, where accurate backward steering is required, the dump truck trailer has been a failure. This is due to the practical impossibility of accurately steering the trailer during backward movement. The length of the coupled truck and trailer is also a serious obstacle under these and similar conditions.

Broadly considered, my invention embodies the use of a dump truck and trailer for transporting loose materials in the usual way, but I have further provided a means whereby the necessity of backing up the coupled trailer and truck is eliminated, and whereby the loading of the trailer or the dumping of its load may be entirely accomplished by the dump truck. This provision precludes the necessity of either driving or backing the trailer into restricted areas, or areas so difficult of approach as to require accurate backward steering. It also avoids the necessity of providing a trailer body with a hoist or dumping equipment.

In carrying out my invention, I provide a trailer chassis on which a body is removably mounted. This body is of a size to be telescopically moved into and carried by the dump truck body. It is movably mounted on suitable tracks, carried by the chassis, whereby the work of transferring it from the trailer to the truck is simplified, and may be entirely accomplished by the driver of the truck merely by properly manipulating the truck relative to the trailer, so that any load may be transferred from one vehicle to the other with ease. Means are also provided for removably securing the trailer body within the truck body, so that dumping of the contents of the former may be accomplished by the same mechanism which dumps the latter.

In the following specification the dump truck will be merely referred to as the "truck", and the dump trailer as the "trailer".

In the drawings—

The remaining figures illustrate a modified form of construction wherein the use of the extensible transfer track on the trailer chassis is omitted.

Considering the drawings in detail: The letter A generally designates a typical truck and B my improved type of trailer.

The truck A may be of any one of the many makes now in common use, having the usual chassis frame 20, yieldingly supported upon front steering wheels—which are not shown, for lack of space—and rear driving wheels 21. Wheels 21 are connected with the frame 20 through the medium of the usual axle, housing and leaf springs 21a. The truck also has the usual power plant (also not shown) operatively connected to the driving wheels 21 in a manner well known to the art.

The trailer chassis, consisting of frame 22, supported upon front wheels 23 and rear wheels 24, through the medium of leaf springs 22a, may also be of the usual type. The draft and steering connection between the truck and trailer may be in the form of a tongue 25, secured to the front steering axle 26 and pivotally connectible with the truck frame 20 by means of an eye 27 engaging a hook 28.

The truck body 29, box-like and open at its rear end, in the usual form, is supported upon a frame 30; the latter being pivotally mounted adjacent its rear end upon a cross shaft 31, supported by brackets 32 on the frame 20. A hoist (not shown), of any of the well known types, may be provided to tilt the body 29 from the position shown in Fig. 1 to that shown in Fig. 5 and vice versa.

Figure 2:
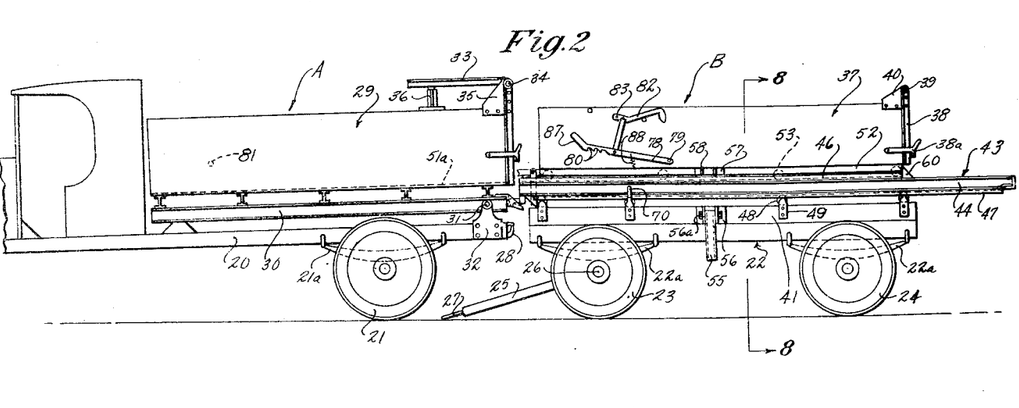
Fig. 2 is a side elevation illustrating the first step in transferring the trailer body to the truck body.

The usual tail-gate 33 is hinged at its top, at a point above the top of the body 29, on a transverse shaft 34, shaft 34 being supported on brackets 35 attached to the body 29. A pair of spaced vertical rests 36 are mounted on the top of the body 29 to support the tail-gate 33 when it is swung to its extreme forward position, as shown in Fig. 2. A latch 33a may be provided to hold the tail-gate closed.

The trailer body 37 is of the same general rectangular configuration as the truck body 29, but of dimensions to permit its being telescoped within the truck body. It has a tail gate 38, hinged at the top on a transverse shaft 39, supported on brackets 40 on the trailer body 37, the same as gate 33. Also, a latch 38a, similar to latch 33a, is provided.

For the purposes of my invention, the trailer body is removably mounted on the frame 22 of the trailer chassis.

In order to raise the trailer body 37 up to the required height, to be transferred into and out of the truck body 29, a sub-frame, formed of side members 41 and transverse end members 42, may be secured on the usual trailer frame 22. This, of course, may be unnecessary where the trailer frame is ordinarily of the proper height above the ground.

A frame, generally designated by the numeral 43, is mounted longitudinally movable on the trailer chassis. This is rectangular in configuration and preferably is formed of I-beam side members 44, joined at their ends by similar cross members 45. In the present instance this frame is somewhat longer than the trailer frame 22 for a purpose which will be hereinafter explained.

Figure 1:
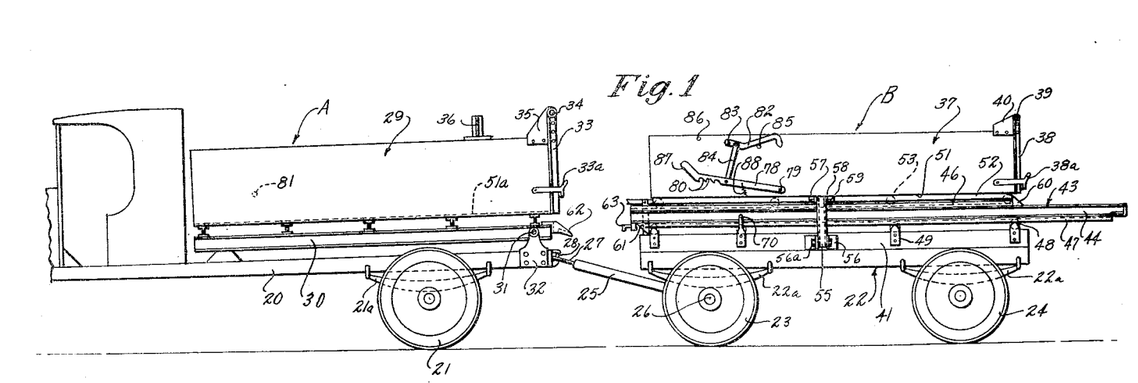
Fig. 1 is a side elevation illustrating the trailer coupled with the truck, in the usual tandem manner for transporting materials.

Secured to the top and bottom flanges of the side frame members 44 are upwardly and downwardly opening channel iron members 46 and 47, respectively. These form tracks extending longitudinally of and parallel to the longitudinal center of the trailer frame 22. Tracks 47 are conterminous with frame members 44, but tracks 46 may be shorter, as shown in Fig. 1.

Frame 43 is movably supported on the frame 22, upon a plurality of non-friction rollers 48, mounted upon the sub-frame side members 41, as by means of brackets 49 and pins 50. As many of these rollers may be supplied as desired and spaced apart the required distances. Tracks 47 ride upon the rollers 48, as particularly shown in Fig. 17.

Secured to the underside of the bottom 51 of the trailer body 37 are longitudinally extending, inverted, channel members 52, spaced apart, transversely of the body, the same distance as tracks 46. Non-friction rollers 53 are carried by these members, in spaced relation, upon pins 54. Rollers 53 ride in tracks 46.

While the frame 43 is freely movable on rollers 48, and the trailer body 37 is freely movable on tracks 46, both the body and frame are normally held against movement, and in the relative positions shown in Fig. 1, by suitable securing means, which may be as follows: Arms 55 are pivotally mounted on brackets 56, secured to the outer faces of sub-frame members 41 on opposite sides of the trailer, by means of pivot pins 56a. These arms swing in a vertical plane transversely of the vehicle. Secured to the body 37, or, preferably, to the channel members 52, are complementary brackets 57 having spaced ears 58 adapted to receive the free ends of arms 55 therebetween, as shown in Figs. 1 and 2. The ends of arms 55 have transversely extending apertures therein, positioned to register with co-axial apertures in the ears 58, for the reception of securing pins 59. An arm 55 is shown in securing position in Fig. 1, and in non-securing position in Fig. 2.

Stops 60 are provided on tracks 46, adapted to be engaged by the rearmost roller 53, to limit rearward movement of the trailer body 37, and these are positioned at the ends of tracks 46, spaced from the rear ends of frame members 44, to stop the body over the frame 22, when the frame 43 is in the relative position shown in Fig. 1.

Stops 61 are also provided at the forward ends of tracks 47, adapted to engage the foremost rollers 48, on sub-frame members 41, to limit rearward movement of the frame 43, as shown in Fig. 1.

Figure 12:
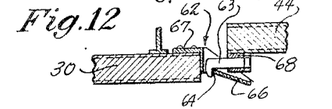
Fig. 12 is a cross-sectional view of Fig. 11 in side elevation taken along the line 12—12 of Fig. 11.
Figure 13:
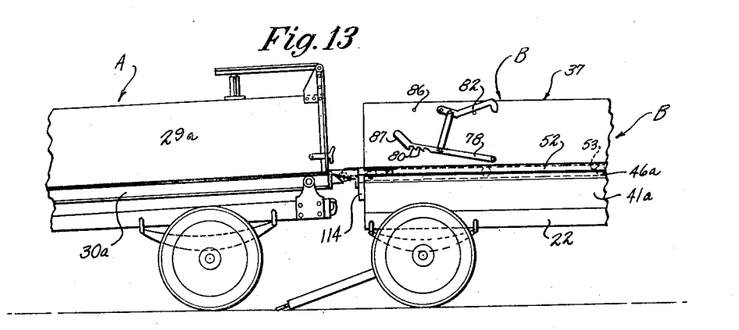
Fig. 13 is a side elevation illustrating the first step in transferring the trailer body to the truck.

A pair of coupling members 62 are provided on the rear end of the truck, preferably rigidly secured to the dump body frame 30, so as to be vertically movable by tilting the body 29. A pair of complementary coupling members 63 are rigidly fixed on the forward end of the frame 43 and positioned, relative to the longitudinal center of the trailer chassis, to be in longitudinal alinement with the members 62, as shown in Figs. 1, 2, 11 and 12. 62 are female members and 63 are male members. Members 62 are in the form of tapered ramps, having side walls or flanges 65, converging to openings 64 in the inclined surfaces or ramps 66. These members may be secured to the dump body frame members 30 by integral brackets 67, as shown in Fig. 12. The complementary members 63 are in the form of hooks projecting forwardly of the frame 43, and are designed to ride upon the ramps 66 and engage in the openings 64, as shown in Fig. 12. Hooks 63 may be rigidly fixed on the frame 43 by means of brackets 68; likewise shown in Fig. 12. The complementary members 62 and 63 may be termed a secondary coupler, the traction coupler, including members 25, 27 and 28, being the primary coupler.

The trailer body supporting means is so constructed that the height of the surfaces of tracks 46 on which rollers 53 ride, are normally the same height above the ground as the top surface of the bottom 51a of the truck body, when both are unloaded, and the coupling members 62 and 63 are so positioned that when the hooks 63 are engaged in openings 64, the top surfaces of tracks 46 are also in a plane with the top surface of bottom 51a of body 29.

The operation is as follows: The truck and trailer are coupled, in tandem, for transportation, whether loaded or unloaded, through the medium of eye 27, on tongue 25, engaging hook 28 on the truck frame 20. If loaded, the end gates 33 and 38 are, of course, closed and latched, and the parts are all in what will be termed their normal positions, as shown in Fig. 1.

Assuming both the truck and trailer to be loaded, when the scene of dumping is reached the trailer is disengaged from the truck by releasing eye 27 from hook 28. The driver then proceeds with the truck and dumps its load at the desired location. He then returns, and the first step in transferring the trailer body 37 to the truck body 29 is backing the truck up to the forward end of the trailer, in proper alinement with it. As the truck load has been dumped and the load still remains upon the trailer, and as the top surfaces of tracks 46 are normally in the same plane with the top surface of bottom 51a of the truck body 29, when both are unloaded, necessarily the bottom of the truck body 29 will be in a plane above the top surfaces of tracks 46. As the truck is backed up in alinement with the trailer, hooks 63 will be engaged by ramps 66, and will ride up over these inclined surfaces and drop into the openings 64, where they will be so held by the load upon the frame 43. Raising of the forward end of frame 43, by hooks 63 riding up on the ramps 66, will not lift frame 43 off rollers 48, as the forward trailer springs 22a, which have been depressed by the weight of the load on them, will react and correspondingly raise the trailer frame.

Before backing up to the trailer the end gate 33, of truck body 29, is thrown forwardly to rest upon the supports 36, as shown in Fig. 2. This is, of course, ordinarily done at the time the load is dumped from the truck body 29.

Figure 3:
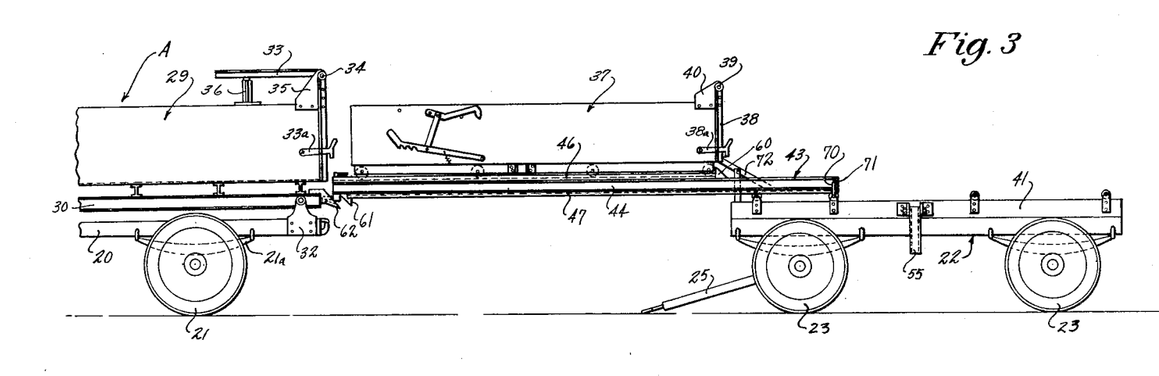
Fig. 3 is a side elevation illustrating the second step in transferring the trailer body to the truck body.

After the truck and trailer have been thus coupled, as shown in Fig. 2, pins 59 are removed, arms 55 released from brackets 57 and swung downwardly from the position shown in Fig. 1 to that shown in Fig. 2. The truck is then moved forwardly, under its own power, from the position shown in Fig. 2 to that shown in Fig. 3, drawing forwardly the frame 43 on rollers 48, and carrying with it the trailer body, as shown in Fig. 3. When in this position the forward end of the frame 43 is supported entirely by the hooks 63 engaging in openings 64, in ramps 66, on the dump body frame, and the rear end of the frame is resting upon two or more rollers 48 on the trailer chassis.

The length of the frame 43 is such that when in its extended position, as shown in Fig. 3, with a portion of its rear end still resting upon the trailer chassis, the rear end of the body 37 will be clear of the forward end of the trailer chassis.

When the frame 43, with body 37 thereon, is drawn forwardly to its full extended position, stops 70, provided on two of the roller brackets 49, engage projections 71 on the extreme rear ends of the side frame members 44. These limit forward movement of the frame 43.

Figure 4:
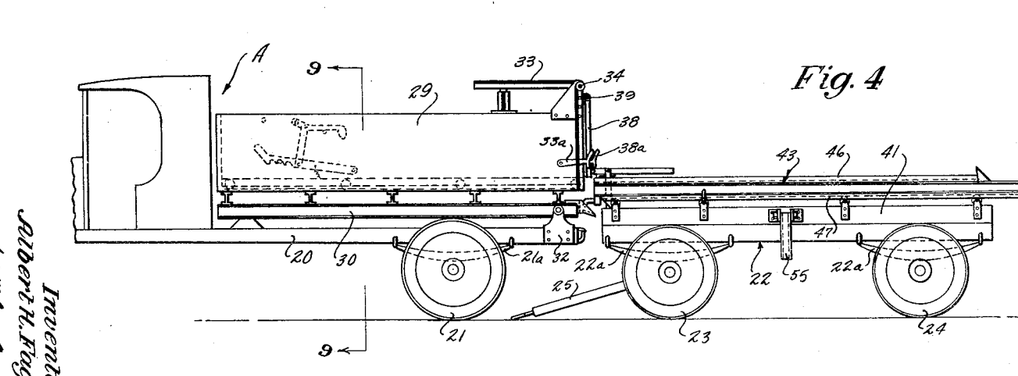
Fig. 4 is a side elevation illustrating the third step in transferring the trailer body to the track body.
Figure 6:
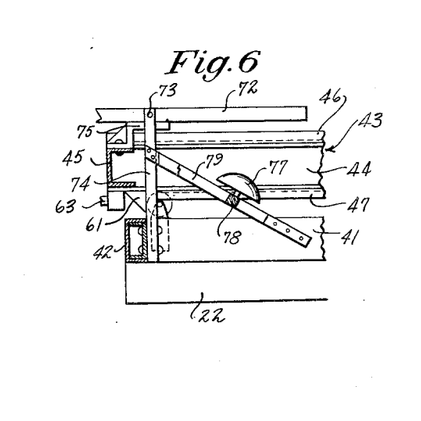
Fig. 6 is a broken side elevational view of the means used in Fig. 4 for holding the trailer body against rearward movement on the trailer chassis, and shows a signalling means which may be used.
Figure 10:
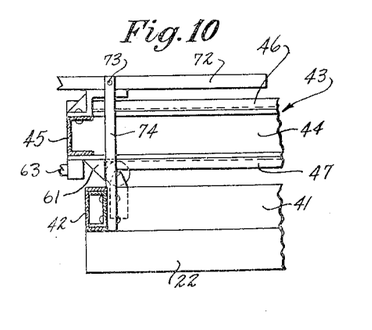
Fig. 10 is the same view as Fig. 6, but without the signalling means.

The next step in transferring the trailer body 37 to the truck body 29, is to again back the truck relative to the trailer, from the position shown in Fig. 3 to that shown in Fig. 4. To move the body 37 telescopically into the body 29, the former must necessarily be held fixed relative to the trailer chassis. To accomplish this I provide a form of device illustrated in Figs. 6, 7 and 10. This consists of an unbalanced lever 72, pivotally mounted adjacent its forward end, as at 73, upon a vertically disposed bar or support 74, the latter being rigidly fixed to the trailer frame 22 and positioned at about its longitudinal center. It is also positioned within the rectangular frame 43, as shown in Figs. 6 and 10. The height of the support 74 is such that the top edge of lever 72 will be in close proximity to the under face of the bottom 51 of the trailer body 37, which will normally hold the lever in substantially the position shown in Fig. 6. As the trailer body 37 reaches its forward position, as shown in Fig. 3, and the bottom 51 of body 37 passes from engagement with the lever 72, the latter will, due to the weight of its unbalanced rear end, drop from the position shown in Fig. 6 to that shown in Fig. 3; the forward end of the lever then being in a position to engage the rear end of the body 37. The lever 72 is held in the position shown in Fig. 6 by a plate 75, fixed on the forward end of frame 43, and positioned to engage the bottom edge of lever 72, beneath and to the rear of its pivotal point 73, when the frame 43 is in its normal rearward position on the trailer chassis, as shown in Fig. 6.

As the truck is backed up, relative to the trailer, in the last step of transferring the trailer body 37 to the truck body 29, body 37, being held fixed relative to the trailer chassis, will be pushed—riding upon its rollers 53—off the tracks 46 and onto the bottom 51a of the truck body 29. Guide rails 76 may be provided on the top face of bottom 51a, of the truck body 29 (see Fig. 9), between which rollers 53 may pass, to guide the trailer body 37 centrally into the truck body 29.

As the truck moves rearwardly towards the trailer, from the position shown in Fig. 3 to that shown in Fig. 4, and as the trailer body 37 passes into the truck body 29, frame 43 is returned to its normal position on the trailer chassis. As the frame 43 nears its normal rearward position on the trailer chassis, the plate 75 engaging the bottom edge of lever 72, tilts it from the position shown in Fig. 3 to that shown in Fig. 4, holding it in a position where it will not interfere with the operation of returning the trailer body 37 to the trailer chassis.

As previously stated, the bar 34 on which the truck end gate 33 is swingingly mounted, is supported by brackets 35 above the top edge of the truck body 29, a sufficient distance to be clear of the top edge of the trailer body 37. The bar 39 on which the trailer end gate 38 is swingingly mounted, may be supported upon brackets 40 so as to come beneath the bar 34 when the body 37 is within the body 29.

Figure 7:
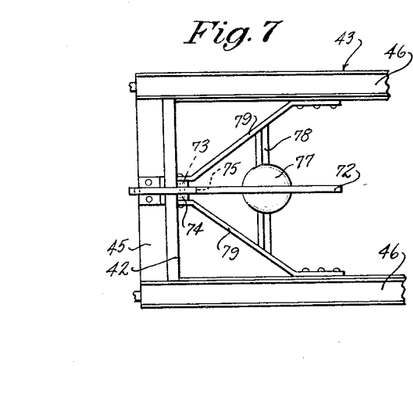
Fig. 7 is a plan view of Fig. 6.

An indicating device which may be used in connection with the lever 72 is illustrated in Figs. 6 and 7. This may be a gong 77 mounted upon a cross bar 78, extending between brace bars 79, and positioned to be struck by the falling end of the lever 72, when it is cleared by the rear end of the forwardly displaced trailer body 37. Such an arrangement may be useful to signal to the driver of the truck when the extreme forward position of the frame 43 is reached, as shown in Fig. 3.

The trailer body 37 must necessarily be held within the truck body 29, during the dumping operation. To accomplish this I provide a bent arm 78, pivotally mounted at 79, on the outside of the trailer body, having serrations 80 in its lower edge adapted to engage a lug 81, projecting inwardly from and fixed to an adjacent side of the truck body 29. The free end of arm 78 is supported in its normal lug-engaging position by a lever 82, pivotally mounted above it, as at 83, and connected with it by a link 84. Stops 85 and 86 are positioned to limit swinging movement of lever 82. When in the position illustrated in Figs. 1, 2 and 3, arm 78 is in position for its forward relatively inclined end 87 to engage lug 81 and be raised so that the latter will engage in one of the serrations 80. Arm 78 is normally held downwardly by a spring 88. To disengage the arm 78 from lug 81, lever 82 is thrown from the position shown in Figs. 1, 2 and 3 to that shown in Fig. 5, by which it is raised to lug-disengaging position.

In transferring the trailer body 37 to the truck body 29, by backing the truck up relative to the trailer chassis from the position shown in Fig. 3 to that shown in Fig. 4, as the loaded trailer body passes finally from tracks 46 on frame 43, being relieved of this load, frame 43 will be raised by the action of the trailer springs 22a, thus lifting the hooks 63 clear of the openings 64 in the ramps 66, and disengaging the truck and trailer. This disengagement is also aided by the weight of the load being transferred to the truck body, which, due to the yielding action of springs 21a, is lowered. After thus transferring the trailer body 37 to the truck body 29, and its being secured in place by engagement of arm 78 with lug 81, the driver then transports the load to the point of discharge. Latch 38a is then released so the end gate 38 is free to swing, when the load is dumped by tilting the truck body in the usual manner.

As shown in Fig. 4, when the transferring operation is completed, the frame 43 is left in its normal position upon the trailer chassis. After dumping the trailer load the truck is then returned and again backed up to the trailer, in proper alinement therewith to cause hooks 63 to again ride up the ramps 66 and engage in openings 64. Both vehicles being relieved of their loads, the difference in elevation between hooks 63 and ramps 66 will not be so great as when the truck is unloaded and the load is upon the trailer. The arm 78 is raised clear of the lug 81 by throwing the lever 82, from the position shown in Figs. 1 and 2 to that shown in Fig. 5. The truck body is then tilted and the trailer body will roll, by gravity, onto tracks 46 of frame 43. The trailer body is then properly secured in place by arms 55, as previously described. Transporting connection is then made by engagement of eye 27, of tongue 25, with hook 28.

Figure 5:
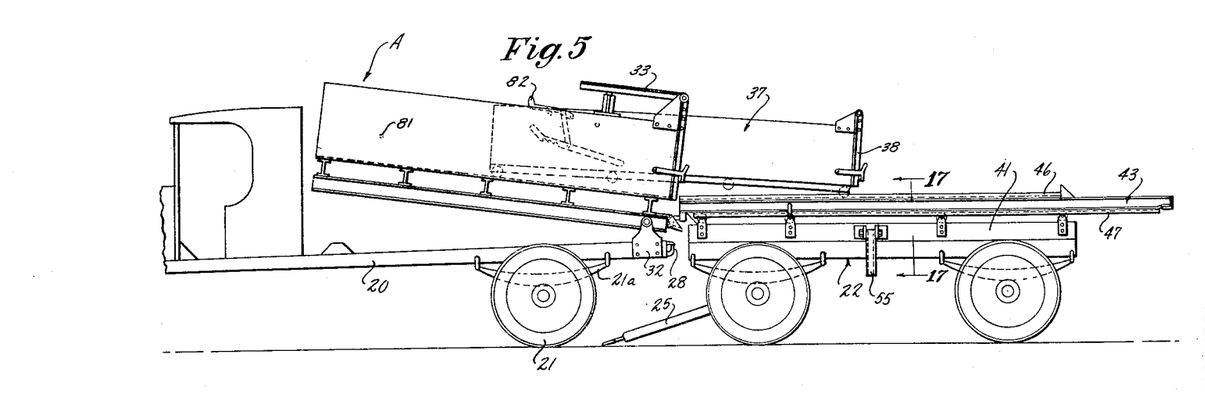
Fig. 5 is a side elevation illustrating the operation of returning the trailer body to the trailer chassis.

In case frame 43 is so far depressed, by the return of the trailer body 37 to the trailer chassis, as to interfere with disengagement of the hooks 63 with openings 64 in ramps 66, the truck body 29 may be tilted, as in Fig. 5, which action will lower ramps 66, relative to hooks 63, and the truck may then be moved forwardly before the body is lowered.

It is readily understood how the same construction facilitates loading the trailer and the truck where the loading ground is too soft or broken for the power of the ruck to handle both loads. In such a case, the trailer body in its telescoped position inside the truck body may first be filled and then transferred to the trailer chassis, which has previously been left at a suitable point on the highway. The truck driver may then make a second trip to fill the truck body and return to couple the trailer to the truck in tandem for transporting the two loads.

Figs. 13, 14, 15, and 16 illustrate a modified form of my invention, dispensing entirely with the movable track used in my preferred embodiment herebefore described.

Figures 8, 17, 18:
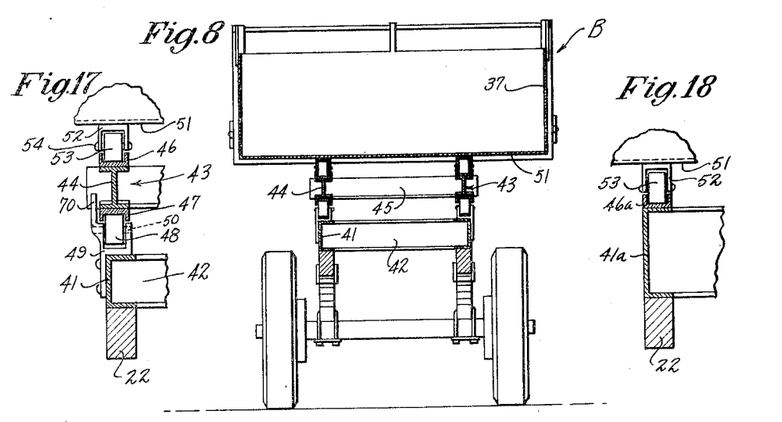
Fig. 8 is a cross-sectional view taken along the line 8—8 of Fig. 2.
Fig. 17 is a fragmentary sectional view taken as indicated by line 17—17 of Fig. 5.
Fig. 18 is a fragmentary sectional view taken as incidated by line 18—18 of Fig. 15.
Figures 9, 11, 19:
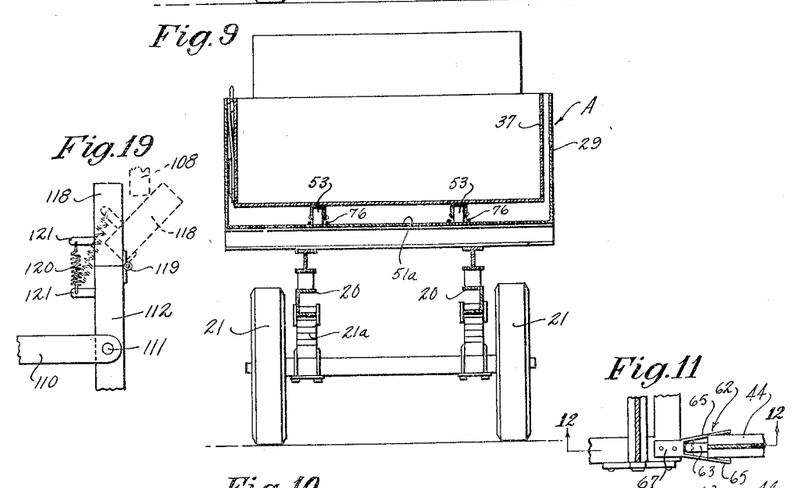
Fig. 9 is a cross-sectional view taken along the line 9—9 of Fig. 4.
Fig. 11 is a fragmentary detailed plan view disclosing the means of coupling the truck to an extensible transfer track normally interposed between the trailed body and the trailer chassis.
Fig. 19 is an enlarged fragmentary detail view of an operating lever shown in Figs. 13, 14 and 15.

In this modified form there is no essential change in the general construction of the truck A and the trailer B. The trailer body 37 is the same, having rollers 53 and can be secured in telescoped relation, inside the dump body 29, by use of the same lever means 78 and lug 81. Trailer chassis 22, however, instead of having rollers mounted on sub-frame members 41, has tracks 46a, in the form of parallel channel members, secured directly to the top edges of sub-frame members, spaced to receive rollers 53 of the trailer body 37, as shown in Fig. 18.

A similar form of coupling means may be used, structurally modified to meet the particular requirements of this form. These may consist of a ramp 66a, having side flanges 65a, converging to openings 64a. These members are likewise preferably secured to the frame 30a of dump body 29a. Hooks 63a are rigidly secured to the forward end of the trailer body 37, in transverse alinement with ramps 66a. In this form the proper relative heights of the trailer and truck bodies, and the coupling members 66a and 63a, may be attained by providing sub-frame members 41a of proper height.

As hooks 63a are secured directly to the trailer body 37, movement of the latter into the truck body will be facilitated by providing rollers 100 on the forward ends of the hooks, positioned to engage fixed inclined surfaces 101. Rollers 100 are positioned in the same horizontal plane as rollers 53, and serve to raise the forward end of the trailer body into proper position to be moved into the truck body, upon backward movement of the truck.

Figure 14:
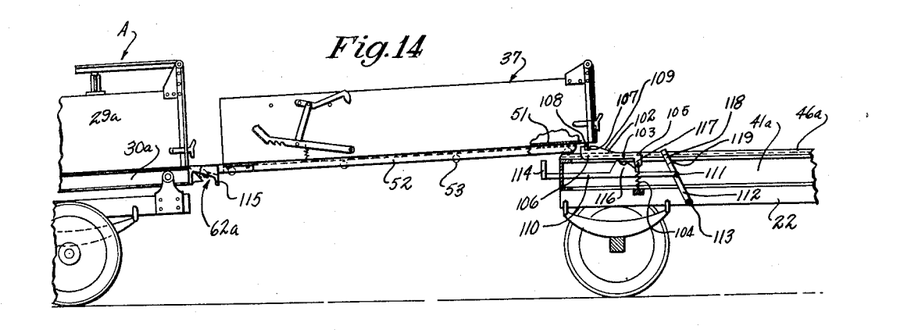
Fig. 14 is a side elevation illustrating the second step in transferring the trailer body to the truck.

The means I employ in my second form of construction for holding the trailer body fixed relative to its chassis, during backward movement of the truck, may be as follows: An unbalanced lever 102 is pivotally mounted adjacent its rear end, on a shaft 103 extending transversely of the sub-frame. Lever 102 is positioned adjacent the forward end of the frame as shown in Fig. 14, and extends substantially along its longitudinal center. It is also positioned in close proximity to the under face of the bottom of the trailer body, so that such engagement will normally hold it in a substantially horizontal position. A spring 104 is provided at the rear end 105 to normally hold the opposite end 106 in yielding contact with the bottom of the body when it is thereover.

The end 106 has in it a recess 107, which is adapted to receive a plate 108, extending downwardly from the bottom of the body 37. Intermediate the recess 107 and the pivotal point of the lever is an inclined surface 109, adapted to be engaged by the plate 108, in passing thereover, to depress end 106 of the lever, against the action of spring 104, until plate 108 reaches recess 107 and passes and extends into it.

A bar 110 is positioned directly beneath the lever 102, as shown in Fig. 14. This is supported at one end by a pivotal connection 111 with a lever 112. Lever 112 is pivotally mounted on a shaft 113 extending transversely between the side members of the frame 22. The opposite end of bar 110 is slidingly supported by extending through an aperture in the end member of the subframe. A transversely extending plate 114 is secured to the outer end of bar 110 and positioned to be engaged by plates 115 on the ramps 66a.

A cam 116, fixed on the bar 110, is positioned to engage a downwardly extending projection 117, on the rear end of lever 102, to raise this end against the action of spring, and to hold the lever in that position until released, as will be later explained.

Lever 112 is of a length to be engaged at its upper end, when in its vertical position, by the plate 108. It has a short end section 118 hinged at 119, to swing towards the rear of the trailer chassis, and a spring 120, connected to pins 121, normally holds this end in the position shown in solid lines in Fig. 19.

In the operation of this form of structure, the truck is backed up to the trailer, in alinement therewith, causing rollers 100 to ride upon ramps 66a, until the hooks drop into the apertures 64a. The truck is then moved forward, relative to the trailer, drawing with it the trailer body on tracks 46a. During this time lever 102, bar 110, lever 112 and plate 114 are in the relative positions illustrated in Fig. 15, with the cam 116 in engagement with end 117, holding the end 106 of lever 102 spaced from the under surface of the trailer body. Also during this time the upper end 118 of lever 112 is in position to be engaged by plate 108. As the rear end of the body 37 approaches the forward ends of tracks 46a, the upper end 118 of lever 112, will be engaged by plate 108, moving this lever, bar 110 and plate 114, from the position shown in Fig. 15 to that shown in Fig. 14. This removes the cam 116 from engagement with the lever end 117, permitting the end 106 of lever 102 to be moved upwardly in contact with the bottom of the body by the action of spring 104. As the body continues its forward movement plate 108 will engage the inclined surface 109, depressing end 106 of the lever until plate 108 passes into recesses 107. This latches the body and trailer together, preventing further relative forward movement between the two.

The next step in transferring the body 37 from the trailer to the truck, is in backing up the truck relative to the trailer. As lever 102 also holds the body 37 against rearward movement relative to the trailer, relative movement of the truck will cause rollers 100 to ride up on the inclined surfaces 101 of the coupling member 62a, thus raising the trailer body in position to then pass telescopically into the truck body 29a.

Figure 15:
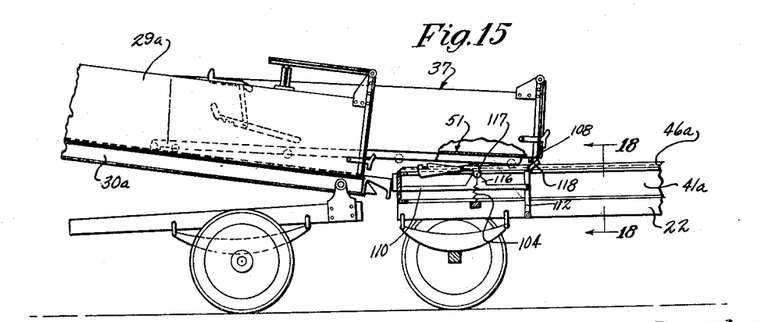
Fig. 15 is a side elevation illustrating the method of returning the trailer body to the trailer chassis.
Figure 16:
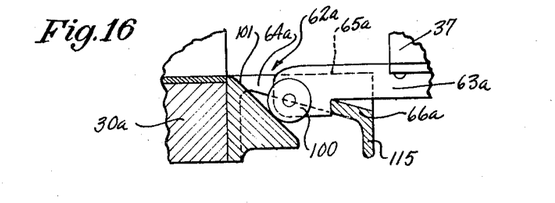
Fig. 16 is a side elevation enlarged and partly in section showing details of a coupling means.

As the truck nears the trailer, in this movement of body 37 into body 29a, plates 115, on their coupling members 62a, will engage plate 114, moving bar 110 from the position shown in Fig. 14 to that shown in Fig. 15. This causes the forward end 106, of lever 102, to be depressed, releasing plate 108, so that the body 37 will then be entirely removed from the trailer.

While in this form of construction the trailer body 37 will not be entirely moved into the truck body 29a, the slight overhanging will not be objectionable, as the trailer body 37 is almost entirely within the truck body 29a. In this arrangement the positioning of arm 78, lever 82 and lug 81 is arranged to compensate for the slight overhanging of the trailer body 37.

As in the final removal of the trailer body 37 from the trailer chassis the lever 102 is moved to position so that its forward end 106 will not be in position to engage plate 108. Return of the trailer body to the trailer chassis may be accomplished in the same manner as described in connection with my first form of device. This is illustrated in Fig. 15.

Plate 114 acts as a stop for rearward movement of the bar 110, which leaves lever 112 extending vertically. It is for this reason that the upper end 118 of lever 112 is provided. This upper end, upon rearward movement of the trailer body on the trailer chassis, will be engaged by plate 108, tipping it over as shown by the dotted lines in Fig. 19, against the action of springs 120. As soon as plate 108 passes over the end 118 the latter will be returned to its normal position, as shown by solid lines in Fig. 19, by the action of spring 120. It is then in a position to be again engaged by plate 108 upon forward movement of the trailer body 37, as shown in Figs. 14 and 15.

While I have herein shown and described the preferred form of my invention, I nevertheless reserve the right to make such changes and modifications in structure as will properly come within the scope of the appended claims.

Having described my invention, I claim:
1. In combination: a truck; a trailer chassis; a body removably mounted on the trailer chassis; and co-operative means in association with the truck, the trailer chassis and the trailer body, so constructed and arranged that the trailer body may be transferred to the truck chassis, and vice versa, by manipulating the truck relative to the trailer.

2. In combination: a truck; a trailer chassis; a body removably mounted on the trailer chassis; and co-operative means in association with the truck, the trailer chassis and the trailer body, so constructed and arranged that the trailer body may be transferred to the truck chassis, by moving the truck forwardly and rearwardly in alinement with the trailer.

3. In combination: a truck chassis having a dump body thereon; a trailer chassis; a body removably mounted on the trailer, said trailer body being of a size to telescopically pass into the dump body; and co-operative means in association with the truck, the trailer chassis and trailer body, so constructed and arranged that the trailer body may be telescopically passed into the dump body, and vice versa.

4. In combination: a truck chassis having a dump body thereon; a trailer chassis; a body removably mounted on the trailer, said trailer body being of a size to telescopically pass into the dump body; and co-operative means in association with the truck, the trailer chassis and trailer body, so constructed and arranged that the trailer body may be telescopically passed into the dump body, and vice versa, by manipulating the truck relative to the trailer.

5. In combination: a truck chassis having a dump body thereon; a trailer chassis; a body removably mounted on the trailer, said trailer body being of a size to telescopically pass into the dump body; and co-operative means in association with the truck, the trailer chassis and trailer body, so constructed and arranged that the trailer body may be telescopically passed into the dump body, by moving the truck forwardly and rearwardly in alinement with the trailer.

6. In combination: a truck; a trailer chassis; a trailer body; means for removably mounting the body on the trailer chassis, including rollers and tracks co-operative to direct said movement longitudinally of the trailer chassis; and co-operative means in association with the truck, the trailer chassis and the trailer body, so constructed and arranged that the trailer body may be transferred to the truck chassis, and vice versa, by manipulating the truck relative to the trailer.

7. In combination: a truck; a trailer chassis; a trailer body; means for removably mounting the body on the trailer chassis, including rollers and tracks co-operative to direct said movement longitudinally of the trailer chassis; and co-operative means in association with the truck, the trailer chassis and the trailer body, so constructed and arranged that the trailer body may be transferred to the truck chassis, by moving the truck forwardly and rearwardly in alinement with the trailer.

8. In combination: a truck chassis having a dump body thereon; a trailer chassis; a body removably mounted on the trailer, said trailer body being of a size to telescopically pass into the dump body; means for removably mounting the body on the trailer chassis, including rollers and track co-operative to direct said movement longitudinally of the trailer chassis; and co-operative means in association with the truck, the trailer chassis and the trailer body, so constructed and arranged that the trailer body may be telescopically passed into the dump body.

9. In combination: a truck chassis having a dump body thereon; a trailer chassis; a body removably mounted on the trailer, said trailer body being of a size to telescopically pass into the dump body; means for removably mounting the body on the trailer chassis, including rollers and tracks co-operative to direct said movement longitudinally of the trailer chassis; and co-operative means in association with the truck, the trailer chassis and the trailer body, so constructed and arranged that the trailer body may be telescopically passed into the dump body, and vice versa, by manipulating the truck relative to the trailer.

10. In combination: a truck chassis having a dump body thereon; a trailer chassis; a body removably mounted on the trailer, said trailer body being of a size to telescopically pass into the dump body; means for removably mounting the body on the trailer chassis, including rollers and tracks co-operative to direct said movement longitudinally of the trailer chassis; and co-operative means in association with the truck, the trailer chassis and the trailer body, so constructed and arranged that the trailer body may be telescopically passed into the dump body, by moving the truck forwardly and rearwardly in alinement with the trailer.

11. In combination: a truck chassis having a dump body thereon; a trailer chassis; a trailer body, said trailer body being of a size to telescopically pass into the dump body; tracks extending longitudinally of the trailer chassis; rollers on the trailer body engaging said tracks; and co-operative means in association with the truck, the trailer chassis and trailer body, so constructed and arranged that the trailer body may be telescopically passed into the dump body.

12. In combination: a truck chassis having a dump body thereon; a trailer chassis; a trailer body, said trailer body being of a size to telescopically pass into the dump body; tracks extending longitudinally of the trailer chassis; rollers on the trailer body engaging said tracks; and co-operative means in association with the truck, the trailer chassis and trailer body, so constructed and arranged that the trailer body may be telescopically passed into the dump body, and vice versa, by manipulating the truck relative to the trailer.

13. In combination: a truck chassis having a dump body thereon; a trailer chassis; a trailer body, said trailer body being of a size to telescopically pass into the dump body; tracks extending longitudinally of the trailer chassis; rollers on the trailer body engaging said tracks; and co-operative means in association with the truck, the trailer chassis and trailer body, so constructed and arranged that the trailer body may be telescopically passed into the dump body, by moving the truck forwardly and rearwardly in alinement with the trailer.

14. In combination: a truck chassis having a dump body thereon; a trailer chassis; a trailer body, said trailer body being of a size to telescopically pass into the dump body; means for movably mounting the body on the trailer chassis, including rollers and tracks co-operative to direct said movement longitudinally of the trailer chassis; coupling means in association with the truck, and complementary coupling means operatively associated with the trailer body, said coupling means being adapted to co-operate to permit the trailer body being drawn forward on the trailer chassis, upon forward movement of the truck, and to be moved telescopically into the dump body, upon rearward movement of the truck; and means on the trailer chassis to latch the trailer body against rearward movement thereon upon rearward movement of the truck.

15. In combination: a truck chassis having a dump body thereon; a trailer chassis; a trailer body, said trailer body being of a size to pass telescopically into the dump body; a track mounted longitudinally movable on the trailer chassis, the trailer body being movably mounted on the track; coupling means in association with said truck, and track; and latching means in association with the trailer chassis and trailer body, the two said means being adapted to cause the trailer body to be passed telescopically into the dump body.

16. In combination: a truck chassis having a dump body thereon; a trailer chassis; a trailer body, said trailer body being of a size to pass telescopically into the dump body; a track mounted longitudinally movable on the trailer chassis, the trailer body being movably mounted on the track; coupling means in association with said truck and track; and latching means in association with the trailer chassis and trailer body, the two said means being adapted to cause the trailer body to be passed telescopically into the dump body, and vice versa, by manipulating the truck relative to the trailer.

17. In combination: a truck chassis having a dump body thereon; a trailer chassis; a trailer body, said trailer body being of a size to pass telescopically into the dump body; a track mounted longitudinally movable on the trailer chassis, the trailer body being movably mounted on the track; coupling means in association with said truck and track; and latching means in association with the trailer chassis and trailer body, the two said means being adapted to cause the trailer body to be passed telescopically into the dump body, by moving the truck forwardly and rearwardly in alinement with the trailer.

18. In combination: a truck having a dump body thereon; a trailer; a trailer body, said trailer body being of a size to pass telescopically into the dump body; a track mounted longitudinally movable on the trailer chassis, the trailer body being movably mounted on the track; co-operative coupling means in connection with the truck and track whereby the track may be moved longitudinally on the trailer chassis, by movement of the truck forwardly and rearwardly relative to and in longitudinal alinement with the trailer; and means on the trailer chassis, adjacent its forward end, whereby the trailer body is held immovable, relative to the trailer chassis, during rearward movement of the truck and track.

19. In combination: a truck having a dump body thereon; a trailer; a trailer body, said trailer body being of a size to pass telescopically into the dump body; a track mounted longitudinally movable on the trailer chassis, the trailer body being movably mounted on the track; co-operative coupling means in connection with the truck and track whereby the track is supported at its forward end on the truck and may be moved longitudinally on the trailer chassis, by movement of the truck forwardly and rearwardly relative to and in longitudinal alinement with the trailer; and means on the trailer chassis, adjacent its forward end, whereby the trailer body is held immovable, relative to the trailer chassis, during rearward movement of the truck and track.

20. In combination: a truck; an extensible trailer chassis; and a body removably mounted on the trailer chassis, said extensible trailer chassis being adapted to be extended and contracted by manipulations of the truck whereby the trailer body may be transferred to the truck.

21. In combination: a truck having a dump body thereon; an extensible trailer chassis; and a trailer body removably mounted on the trailer chassis, said extensible trailer chassis being adapted to be extended and contracted by manipulations of the truck whereby the trailer body may be telescopically passed into the dump body.

22. In combination: a truck having a dump body thereon; an extensible trailer chassis; and a trailer body removably mounted on the trailer chassis, said extensible trailer chassis being adapted to be extended and contracted by manipulations of the truck whereby the trailer body may be telescopically passed into the dump body, said trailer body being adapted to be returned to the trailer chassis from the truck by inclination of the dump body.

23. In combination: a truck; a trailer chassis; a displaceable member associated with the trailer chassis; a body removably mounted on the displaceable member; said displaceable member being adapted to be moved by manipulating the truck relative to the trailer chassis, whereby the body may be transferred from the trailer chassis to the truck.

24. In combination: a truck; a dump body mounted on the truck; a trailer chassis; a trailer body removably mounted on the trailer chassis; and a displaceable member associated with the trailer chassis and adapted to be moved by manipulating the truck relative to the trailer chassis, whereby the trailer body may be telescopically passed into the dump body.

25. In combination: a truck; a dump body mounted on the truck; a trailer chassis; a trailer body removably mounted on the trailer chassis; and a displaceable member associated with the trailer chassis and adapted to be moved by manipulating the truck relative to the trailer chassis, whereby the trailer body may be telescopically passed into the dump body, said trailer body being adapted to be returned to the trailer chassis from the truck by inclination of the dump body.

26. In combination: a truck; a trailer chassis; a displaceable member associated with the trailer chassis; a body removably mounted on the displaceable member; said displaceable member being adapted to be moved by manipulating the truck relative to the trailer chassis, whereby the body may be transferred from the trailer chassis to the truck, the displaceable member being partially supported by the truck while being so moved.

27. In combination: a truck; an extensible trailer chassis; a trailer body removably mounted on the trailer chassis; a traction coupler associated with the truck and the trailer chassis whereby the trailer chassis may be hauled by the truck; and an automatic secondary coupler associated with the truck and the trailer chassis whereby movements of the truck relative to the trailer chassis may extend and contract the trailer chassis and thereby transfer the trailer body to the truck.

28. In combination: a truck; a dump body mounted on the truck; an extensible trailer chassis; a trailer body removably mounted on the trailer chassis; a traction coupler associated with the truck and the trailer chassis whereby the trailer chassis may be hauled by the truck; and an automatic secondary coupler associated with the truck and the trailer chassis whereby movements of the truck relative to the trailer chassis may extend and contract the trailer chassis and thereby telescopically pass the trailer body into the dump body.

29. In combination: a truck; a dump body mounted on the truck; an extensible trailer chassis; a trailer body removably mounted on the trailer chassis; a traction coupler associated with the truck and the trailer chassis whereby the trailer chassis may be hauled by the truck; and an automatic secondary coupler associated with the truck and the trailer chassis whereby movements of the truck relative to the trailer chassis may extend and contract the trailer chassis and thereby telescopically pass the trailer body into the dump body, said secondary coupler being adapted to suitably align the truck and the trailer chassis vertically and horizontally.

30. In combination: a truck; a trailer chassis; a body removably mounted on the trailer chassis; a coupler in association with the truck and in operative association with the body; and a latch associated with the trailer chassis and the trailer body, said coupler and latch being adapted to cooperate whereby the trailer body may be transferred to the truck chassis.

31. In combination: a truck; a trailer chassis; a body removably mounted on the trailer chassis; a coupler member on the truck; a complementary coupler member on the body; and a latch associated with the trailer chassis and the body, said coupler members being adapted to be engaged by movement of the truck towards the trailer chassis and to serve to displace the body relative to the trailer chassis when the truck then moves from the trailer chassis, said latch being adapted to resist movement of the body when the truck again moves towards the trailer chassis, thereby disengaging said coupler members and transferring the body to the truck.

32. In combination: a truck; a trailer chassis; a body removably mounted on the trailer chassis; a coupler member on the truck; a complementary coupler member on the body; and a latch associated with the trailer chassis and the body, said coupler members being adapted to be engaged by movement of the truck towards the trailer chassis and to serve to displace the body relative to the trailer chassis when the truck then moves from the trailer chassis, said latch being adapted to prevent complete disengagement of the body from the trailer chassis when the body is displaced by forward movement of the truck and to resist movement of the body when the truck again moves towards the trailer chassis, thereby disengaging said coupler members and transferring the body to the truck.

33. In combination: a truck; a trailer chassis; a body removably mounted on the trailer chassis; means incorporating a coupler on the truck and a complementary coupler associated with the trailer body whereby the trailer body may be transferred to the truck chassis and vice versa by movements of the truck relative to the trailer; and co-operatively engageable complementary means operatively associated with said couplers to align the trailer body with the truck bed preliminary to such transfer.

34. In combination: a truck; a trailer chassis; a body removably mounted on the trailer chassis; means incorporating a coupler on the truck and a complementary coupler on the trailer chassis whereby the trailer body may be transferred to the truck chassis and vice versa by movements of the truck relative to the trailer; and a ramp associated with one of said couplers and adapted to cooperate with the other coupler prior to engagement of the couplers to automatically align the truck and the trailer chassis vertically in suitable relation to facilitate transfer of the trailer body.

35. In combination: a truck; a trailer chassis; a body removably mounted on the trailer chassis; means incorporating a coupler on the truck and a complementary coupler on the trailer chassis whereby the trailer body may be transferred to the truck chassis and vice versa by movements of the truck relative to the trailer; a ramp associated with one of said couplers and adapted to cooperate with the other coupler prior to engagement of the couplers to automatically align the truck and the trailer chassis vertically in suitable relation to facilitate transfer of the trailer body; and converging guides associated with one of said couplers and adapted to cooperate with the other coupler prior to engagement of the couplers to automatically align the truck and the trailer chassis horizontally.

36. In combination: a truck; a trailer chassis; a body removably mounted on the trailer chassis; means incorporating a coupler on the truck and a complementary coupler on the trailer chassis whereby the trailer body may be transferred to the truck chassis and vice versa by movements of the truck relative to the trailer; and a ramp associated with one of said couplers and adapted to cooperate with the other coupler prior to engagement of the couplers to automatically align the truck and the trailer chassis vertically in suitable relation to facilitate transfer of the trailer body, said ramp having such a vertical range as to compensate for the variations in relative heights of the truck and trailer chassis that are occasioned by weight variations in loading.

37. In combination: a truck; a trailer chassis including a frame, axles with wheels thereon, and springs supporting said frame on said axles; a body removably mounted on the trailer chassis; means incorporating a coupler on the truck and a complementary coupler on the trailer body whereby the trailer body may be transferred to the truck chassis and vice versa by movements of the truck relative to the trailer; and a ramp associated with one of said couplers and adapted to cooperate with the other coupler prior to engagement of the couplers to automatically align the truck and the trailer chassis vertically in suitable relation to facilitate transfer of the trailer body.

38. In combination: a truck; a trailer chassis including a frame, axles with wheels thereon, and springs supporting said frame on said axles; a body removably mounted on the trailer chassis; means incorporating a coupler on the truck and a complementary coupler on the trailer body whereby the trailer body may be transferred to the truck chassis and vice versa by movements of the truck relative to the trailer; a ramp associated with one of said couplers and adapted to cooperate with the other coupler prior to engagement of the couplers to automatically align the truck and the trailer chassis vertically in suitable relation to facilitate transfer of the trailer body; and converging guides associated with one of said couplers and adapted to cooperate with the other coupler prior to engagement of the couplers to automatically align the truck and the trailer chassis horizontally.

39. In combination: a truck; a trailer chassis including a frame, axles with wheels thereon, and springs supporting said frame on said axles; a body removably mounted on the trailer chassis; means incorporating a coupler on the truck and a complementary coupler on the trailer body whereby the trailer body may be transferred to the truck chassis and vice versa by movements of the truck relative to the trailer; and a ramp associated with one of said couplers and adapted to cooperate with the other coupler prior to engagement of the couplers to automatically align the truck and the trailer chassis vertically in suitable relation to facilitate transfer of the trailer body, said ramp having such a vertical range as to compensate for the variations in relative heights of the truck and trailer chassis that are occasioned by weight variations in loading.

40. In combination: a vehicle chassis; a second vehicle chassis supported to yield vertically to the weight of a superimposed load;

a body carried by the second chassis, to receive a load, adapted to be transferred therefrom to the first chassis; and draft coupling means comprising two complementary, rigidly mounted members, carried respectively by the two chassis, and adapted for coupling engagement by impact and vertical movement of the second mentioned chassis relative to the first, and, conversely, adapted for disengagement by vertical movement of the second mentioned chassis relative to the first.

41. In combination: a vehicle chassis, supported to yield to the weight of a superimposed load; a second vehicle chassis likewise supported to yield to a superimposed load; a body carried by the second mentioned chassis, to receive a load, adapted to be transferred to the first mentioned chassis; and draft coupling means comprising rigid, complementary members, rigidly fixed to the respective chassis, adapted for coupling engagement by impact and relative vertical movement of said chassis, and, conversely, adapted for disengagement by relative vertical movement of said chassis.

42. In combination: a truck having a bed; a trailer; a body removably mounted on the trailer; cooperative means whereby the trailer body may be transferred to the truck by forward and rearward movement of the truck relative to the trailer and vice versa; said means including coupling means on the truck and complementary coupling means adapted for engagement therewith, whereby the trailer body may be drawn from the trailer; and means whereby the trailer body is aligned with the truck bed, both horizontally and vertically, preliminary to the coupling engagement of said means.

43. In combination: a truck having a bed; a trailer; a body removably mounted on the trailer; cooperative means whereby the trailer body may be transferred to the truck by forward and rearward movement of the truck relative to the trailer and vice versa; said means including coupling means on the truck and complementary coupling means adapted for engagement therewith, whereby the trailer body may be drawn from the trailer; means in association with the trailer and body to hold the body against movement on the trailer during rearward movement of the truck, whereby the body is moved onto the truck bed; and means whereby the trailer body is aligned with the truck bed, both horizontally and vertically, preliminary to the coupling engagement of said means.

In witness that I claim the foregoing I have hereunto subscribed my name this 15th day of February, 1930.

ALBERT H. FAGER.